July 22, 1958  E. H. STONICH ET AL  2,844,392
PACKING GLAND FOR VALVE STEM
Original Filed June 27, 1952
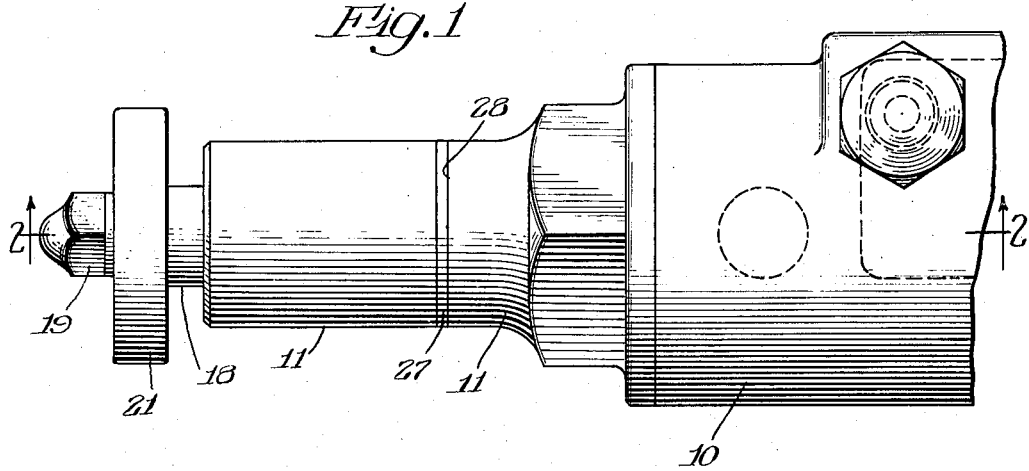
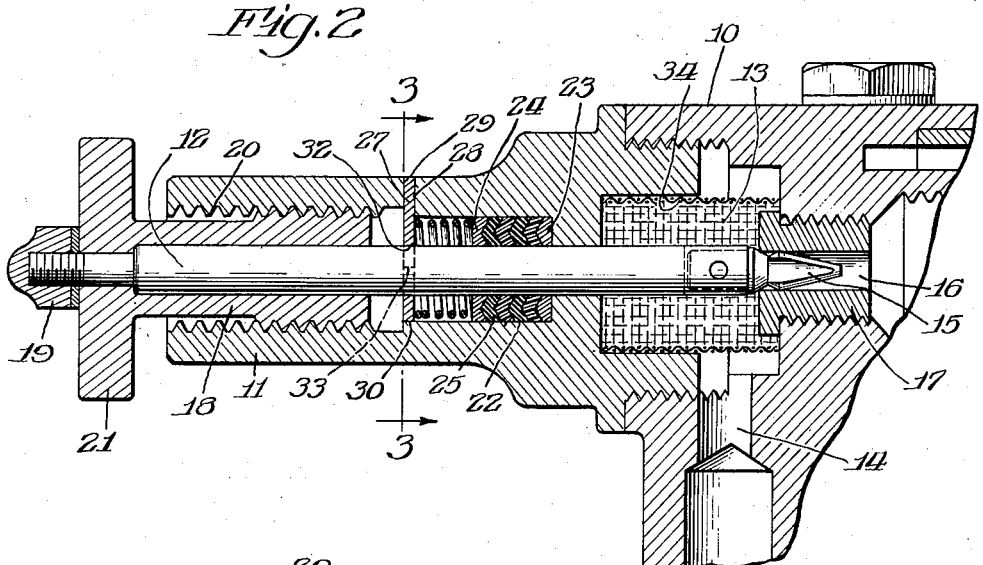
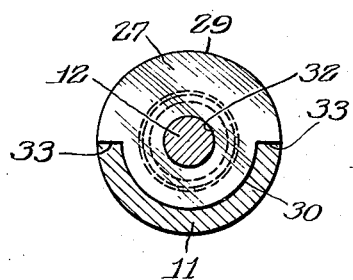
Inventors:
Elwood H. Stonich
Edward B. Moore
By Harvey M. Gillespie
Atty.

2,844,392
Patented July 22, 1958

2,844,392

PACKING GLAND FOR VALVE STEM

Elwood H. Stonich, Chicago, and Edward B. Moore, La Grange Park, Ill., assignors to Vapor Heating Corporation, Chicago, Ill., a corporation of Delaware Original application June 27, 1952, Serial No. 295,987. Divided and this application August 25, 1954, Serial No. 452,186

4 Claims. (Cl. 286—7)

This invention relates to an improved packing gland for a valve stem.

The subject matter of the present invention was originally disclosed in our co-pending application Serial 295,987, filed June 27, 1952, of which the present application is a division.

A principal object of the present invention is to provide improved means for packing a valve stem so as to insure that the packing will be pressed by a constant and uniform sealing pressure against the valve stem and its surrounding housing to prevent leakage and which will also simplify the installation of the packing in the gland structure, avoid undue binding of the valve stem in the packing and also prevent undue tampering with the packing gland.

According to the invention, a series of packing rings arranged within a cylindrical recess in a housing structure are pressed, by means of a coil spring, into sealing engagement with the surface of a valve stem and the adjacent walls of said cylindrical recess. An abutment for the outer end of said spring is positioned in a transverse slot formed in the housing so as to maintain the spring under a predetermined compression. The said abutment is in the form of a plate formed with an opening through which the valve stem extends and thereby provides an interlocking engagement between the valve stem and the said abutment to hold the latter in its applied position.

A preferred embodiment of the invention is shown in the accompanying drawing wherein:

Fig. 1 is a top view in elevation of a fragmentary portion of a valve housing and a bonnet attached thereto and containing the improved packing gland of the present invention;

Fig. 2 is a vertical section through the structure shown in Fig. 1, the section being taken on line 2—2 thereof;

Fig. 3 is a transverse section taken through Fig. 2 substantially on line 3—3 to illustrate the position of an abutment element for retaining the packing elements in position.

Referring to the drawing: The invention is illustrated in connection with a valve housing 10 and a bonnet 11 secured thereto and enclosing a valve operating stem 12. The said bonnet 11 has a threaded engagement with the valve housing 10 and cooperates with a portion thereof to define an inlet chamber 13 for receiving steam or other fluids from a supply passage 14. The inner end of the valve stem 12 is provided with a valve 15 for controlling the opening and closing of a port 16 formed in a removable valve seat element 17. The outer end of the valve stem 12 extends through a central bore of a screw threaded element 18 and is fixed thereto by means of a clamp nut 19. The said screw element 18 has threaded engagement with internal threads 20 formed in the outer end of the bonnet 11 so that inner and outer threading movements of the element 18 moves the valve stem 12 lengthwise of the bonnet 11 and thereby moves the valve 15 into and out of its port closing position. In order to facilitate operation of the screw element 18 its outer end is provided with a handwheel 21.

The bonnet 11 includes a chamber 22 for containing suitable packing for the valve stem 12. The packing is preferably of the chevron type and includes a pair of metallic adaptor rings 23—24 between which a plurality of compressible packing rings 25 are positioned. The opposing faces of the said adaptor rings 23—24 are formed with configurations corresponding to the contours of the adjacent surfaces of the chevron packing rings. A coil spring is interposed between the adaptor ring 24 and an abutment plate 27 so as to exert pressure against the packing rings and thereby press them with uniform pressure into sealing engagement with the valve stem 12 and the cylindrical wall of the chamber 22. The abutment plate 27 is inserted into a preferably close fitting slot 28 which extends half-way through the bonnet 11. One portion 29 of the abutment plate 27 has a diameter corresponding to the external diameter of the transversely slotted portion of the bonnet 11 and another portion 30 of said abutment plate is curved to fit the curvature of the packing chamber 22. The valve stem 12, it will be observed, extends through an opening 32 formed in the said abutment plate 27 and thereby holds the plate in its operative position within the slot 28. When the abutment plate 27 is in its applied position the lateral shoulders 33—33 extending from the curved edge portion 30 to the outer surface 29 seat against the end walls of the slot 28.

A cylindrical screen 34 is positioned in the inlet chamber 13 between the supply passage 14 and the port 16.

Inasmuch as the present invention is directed to the improved packing gland hereinabove described, the valve 15 and the associated valve housing 10 are described only in general terms and reference may be had to our said co-pending application Ser. No. 295,987 for their detailed constructions.

We claim:

1. A packing gland structure for a valve stem comprising, in combination, a housing formed with an axial bore providing a packing chamber having a cylindrical side wall and an end wall and the housing being formed with a transverse slot having end walls which extend radially outwardly from the cylindrical side wall of the packing chamber to the outer surface of the housing, said end walls are at least 180° from each other measured on the slotted circumference of the packing chamber side wall, a valve stem extending through said axial bore, and means for sealing the space between the valve stem and the housing comprising packing material positioned in said packing chamber, a helical spring surrounding said valve stem within said packing chamber in a position to exert pressure against the packing material to force it into sealing engagement with the valve stem and the side wall of said chamber, and an abutment plate for said spring positioned in said transverse slot perpendicular to the longitudinal axis of said chamber for holding said spring under compression, and the said abutment plate being formed with an opening for receiving said valve stem, whereby the abutment plate is held against movement in said transverse slot.

2. A packing gland structure according to claim 1 characterized in that the packing material comprises a plurality of rings of V-configuration in cross-section arranged in nested relation between a pair of metallic ring elements having opposing faces formed with configurations for nesting with the configurations of adjacent rings of packing material.

3. A packing gland structure according to claim 2 characterized in that a portion of the perimeter of said abutment plate is in alignment with the external surface of the housing and another portion of the perimeter of said abutment plate conforms to the contour of said packing chamber.

4. A packing gland structure according to claim 3 characterized in that said abutment plate is provided with radial surfaces for seating against the end walls of said transverse slot.

References Cited in the file of this patent

UNITED STATES PATENTS

| | | |
|---|---|---|
| 1,346,421 | Russell et al. | July 13, 1920 |
| 1,604,501 | Thomas | Oct. 26, 1926 |
| 2,334,396 | Dorward | Nov. 16, 1943 |
| 2,403,875 | Neumann | July 9, 1946 |
| 2,441,146 | Harrison | May 11, 1948 |